(12) United States Patent
Rogson et al.

(10) Patent No.: US 6,857,129 B2
(45) Date of Patent: Feb. 15, 2005

(54) SIGNAL RECEIVING VIDEO RECORDING APPARATUS AND METHOD (75) Inventors: Ariel S. Rogson, 6854 SW. Ashdale Dr., Portland, OR (US) 97223; Gregory T. Kavounas, Vancouver, WA (US)

(73) Assignee: Ariel S. Rogson, Portland, OR (US)

( * ) Notice: Subject to any disclaimer, the term of this patent is extended or adjusted under 35 U.S.C. 154(b) by 0 days.

(21) Appl. No.: 09/836,581

(22) Filed: Apr. 16, 2001

(65) Prior Publication Data

US 2002/0150386 A1 Oct. 17, 2002

(51) Int. Cl.$^7$ .............................................. H04N 5/445
(52) U.S. Cl. ......................... 725/58; 725/133; 386/46; 386/83
(58) Field of Search ...................... 725/58, 132, 133, 725/134; 386/16, 46, 29, 35, 83, 84; 348/734

(56) References Cited

U.S. PATENT DOCUMENTS

| | | | | |
|---|---|---|---|---|
| 4,706,121 A | * | 11/1987 | Young | 725/58 |
| 4,787,063 A | * | 11/1988 | Muguet | 386/83 |
| 4,945,563 A | * | 7/1990 | Horton et al. | 380/203 |
| 5,151,789 A | * | 9/1992 | Young | 725/133 |
| 5,423,555 A | * | 6/1995 | Kidrin | 463/31 |
| 5,485,219 A | * | 1/1996 | Woo | 348/460 |
| 5,892,536 A | * | 4/1999 | Logan et al. | 725/34 |
| 5,946,050 A | * | 8/1999 | Wolff | 348/553 |
| 6,208,799 B1 | * | 3/2001 | Marsh et al. | 386/83 |
| 6,275,648 B1 | * | 8/2001 | Knudson et al. | 348/906 |
| 6,549,718 B1 | * | 4/2003 | Grooters et al. | 725/58 |
| 6,681,396 B1 | * | 1/2004 | Bates et al. | 725/58 |
| 6,732,372 B2 | * | 5/2004 | Tomita et al. | 725/47 |
| 2003/0159150 A1 | * | 8/2003 | Chernock et al. | 725/58 |

OTHER PUBLICATIONS

Heller, "VPS a new System for domestic VCR start/stop by programme labels transmitted within the insertion data line" Jun. 1985, Broadcast Sessions Symposium Record.*

* cited by examiner

Primary Examiner—Vincent Boccio
Assistant Examiner—James A. Fletcher
(74) Attorney, Agent, or Firm—Marger, Johnson & McCollom, PC (57) ABSTRACT The user selects a program to record using a video recorder. The user programs the video recorder with the date, time, and channel of the selected program. The video recorder receives a start signal generated externally, and activates, recording the selected program.

33 Claims, 5 Drawing Sheets

YOUR VIDEO PROGRAM PROVIDER

Channels

|  |  | 2 | 3 | 4 | 5 | 6 | 7 | ... |
|---|---|---|---|---|---|---|---|---|
| 3/18/ 2001 | 3:30 PM |  |  |  |  |  |  | ... |
|  | 4:00 PM |  |  |  |  | X |  | ... |
|  | 4:30 PM |  |  |  |  |  |  | ... |
|  | ⋮ |  |  |  |  |  |  |  |
| 3/19/ 2001 | 3:30 PM |  |  |  |  |  |  | ... |
|  | 4:00 PM |  |  |  | X |  |  | ... |
|  | 4:30 PM |  |  |  | X |  |  | ... |
|  | ⋮ |  |  |  |  |  |  |  |

⋮

Click on the program you want to record

Enter the URL of your VCR to which the start signal will be sent: __________

FIG. 5

SIGNAL RECEIVING VIDEO RECORDING APPARATUS AND METHOD

FIELD OF THE INVENTION

This invention pertains to recording video using an internetwork-enabled recording device.

BACKGROUND OF THE INVENTION

The invention of the videocassette recorder (VCR) changed the way people look at television. No longer were people bound to the time slot assigned to a television program by the network: they could tape the show and watch it at a more convenient time. This activity was given legal sanction by the United States Supreme Court in *Sony Corp. v. Universal City Studios, Inc.*

But the ability to record a television program has always been limited by the user's ability to program the VCR. Almost since the day the VCR was first established as a commodity for the average consumer, there have been jokes about people's VCRs constantly blinking "12:00" (indicating the VCR's clock has not been programmed). Unless the clock is accurately programmed, a VCR cannot record a show for the consumer.

In recent years, the manufacturers of VCRs have begun to make the VCR smarter, in an effort to simplify the programming operation. Modern VCR clocks can be programmed by simply setting the VCR to the local public broadcasting station and punching a button. The VCR "contacts" the station and determines the local time. The adoption of VCRPlus® codes has made the task of programming a particular show simpler. The user need only punch in the VCRPlus® code, which the VCR can then translate into a channel, start time, and stop time. (VCRPlus is a registered trademark of Gemstar Development Corporation at the time this document is being filed with the U.S. Patent and Trademark Office.)

But with all the advances in VCR technology, there are three significant limitations to the VCR recording the desired show. First, the consumer is beholden to his signal provider to be able to record his desired show. Be it broadcast television, cable, or satellite, if the signal provider decides to change the broadcast time of the show, the VCR's programming does not change, and the wrong program is recorded.

Second, the consumer is dependent on an accurate clock to record the desired show. Because most people's clocks are not accurate (despite serious efforts to keep clocks accurate), most people introduce a "fudge factor" into their programming. Thus, if a program is supposed to be broadcast from 5:00 PM to 5:30 PM, most people will program their VCRs to start recording a few minutes before 5:00 PM, and to stop recording a few minutes after 5:30 PM.

Third, even if the consumer's clock is accurate, that is only half of the problem. The signal provider's clock might also be inaccurate. Even when a signal provider says that a show will start at 5:00 PM, that statement might not be accurate. The program might start a little before or after 5:00 PM, depending on the accuracy of the signal provider's clocks. Thus, the consumer has to allow for some inaccuracy in the programming schedule.

Accordingly, a need remains for an improvement to the videocassette recorder and a method to use an improved videocassette recorder that eliminates concern for inaccurate clocks (both by the consumer and the signal provider) and for programming changes by the signal provider.

SUMMARY OF THE INVENTION

The invention includes a recording device, a broadcast device, and a method and software for using a video recording apparatus to record a video program without concern about accurate clocks or programming changes. The user selects a program to record using the video recording apparatus. The information about the selected program is programmed into the video recording apparatus. Shortly before the program is to begin its broadcast, the video recording apparatus receives an externally-generated start signal, at which time the video recording apparatus begins to record the program.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
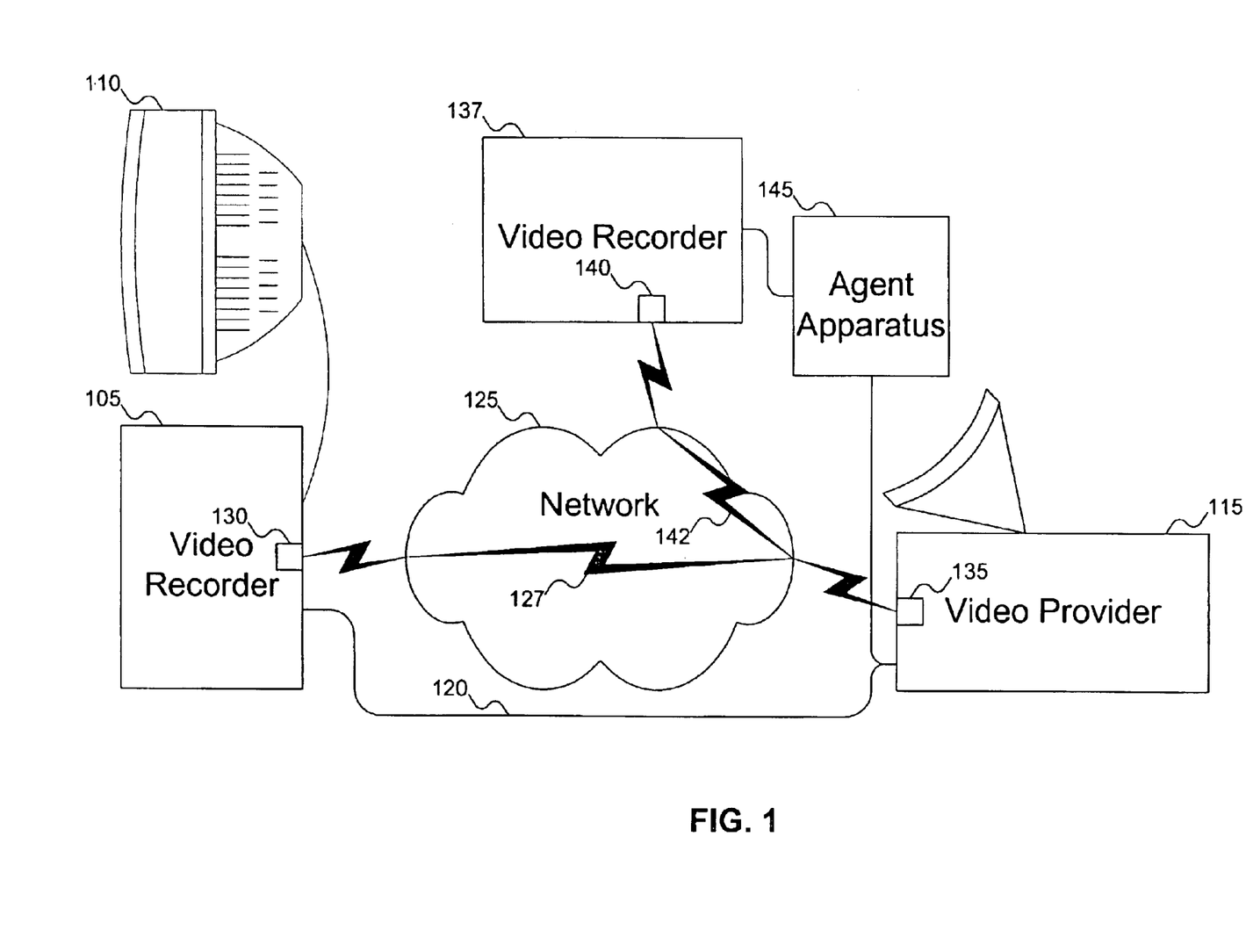
FIG. 1 shows a video recording apparatus according to an embodiment of the invention.

FIG. 1 shows a video recording apparatus according to an embodiment of the invention. In FIG. 1, video recorder 105 is connected to television 110. Video recorder 105 is preferably a videocassette recorder, but a person skilled in the art will recognize that other types of video recorders can be used as well. For example, video recorder 105 can record on a writeable digital video disc (DVD). Video recorder 105 can display images on television 110, and can record images for later display on television 110.

Video recorder 105 receives input from video provider 115 (or more generally, any kind of signal provider). Video provider 115 can be a cable company, a satellite television company, a public broadcaster, or any other kind of signal provider. Video provider 115 can also be an originator of the signal, or an agent that relays the signal. For purposes of this discussion, video provider 115 is assumed to be a cable company, and cable 120 is used to carry the video signal to video recorder 105. A person skilled in the art will recognize how this invention can be adapted to other signal providers. In addition, if cable 120 provides for two-way communication, cable 120 can be used for communications between video recorder 105 and video provider 115.

Both video recorder 105 and video provider 115 are preferably connected to internetwork 125. Internetwork 125 allows video recorder 105 and video provider 115 to communicate directly using two-way communications channel 127. Although channel 127 is shown as separate from cable 120, a person skilled in the art will recognize that channel 127 can also be included in cable 120. To achieve this internetwork capability, both video recorder 105 and video provider 115 are equipped with networking apparatus (shown as 130 and 135, respectively). Preferably, networking apparatus 130 and 135 are network interface cards, but a person skilled in the art will recognize other ways video recorder 105 and video provider 115 can communicate. Video recorder 105 can even have its own address with respect to two-way communications channel 127.

FIG. 1 also shows second video recording apparatus 137. Although video recording apparatus 137 can be a second video recording apparatus owned by the same person as that who owns video recording apparatus 105, it is rare that a video provider, such as video provider 115, provides a signal to a single subscriber. Rather, the signal, transmitted over cables such as cable 120, is transmitted to many subscribers. Video recording apparatus 137 typically will belong to another subscriber. As with video recording apparatus 105, video recording apparatus 137 includes networking apparatus 140, so as to establish two-way communications channel 142. Two-way communications channel 140 operates similarly to two-way communications channel 127.

Between video provider 115 and video recording apparatus 137 is agent apparatus 145. Agent apparatus 145 is an agent used to relay a signal from video provider 115 to video recording apparatus 137. Agent apparatus 145 is a device that receives the signal from video provider 115, isolates a single program from the video signal, and relays that program to video recording apparatus 137.

Agent apparatus 145 is used when video recording apparatus 137 cannot properly isolate and/or receive the selected program from the video signal. Many video recording apparatuses today are capable of selecting a single program from the video signal provided by video provider 115, provided that the video signal is transmitted using a recognized protocol. But in some situations the video recording apparatuses cannot properly interpret the signal. This can occur, for example, if the video signal is scrambled. Sometimes this happens because video provider 115 scrambles every program, to prevent non-subscribers from tapping into the video signal and receiving programming without paying the appropriate fee. Other times, video provider 115 scrambles only certain programs, typically programs for which the subscribers need to pay a premium to watch. If the subscriber pays for the premium program, then agent apparatus 145 unscrambles the program and relays the unscrambled program to video recording apparatus 137. Agent apparatus 145 is often a set-top box that is provided by video provider 115 to the subscriber. A person skilled in the art will recognize that if a subscriber does not want to view any premium programs, then the subscriber might not need an agent apparatus. This explains why video recording apparatus 137, but not video recording apparatus 105, has agent apparatus 145 to unscramble the video signal.

Figure 2:
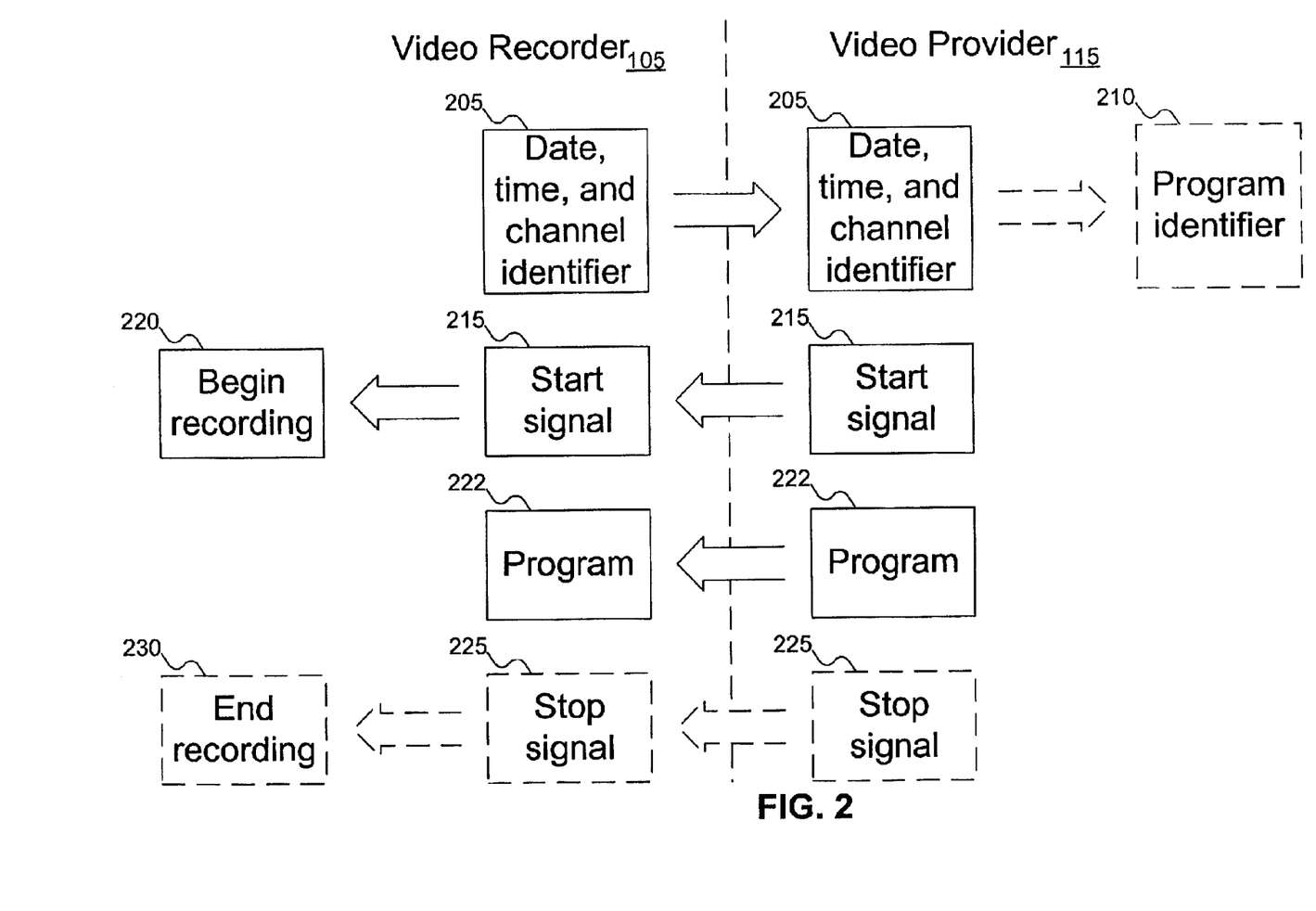
FIG. 2 shows the interchange of signals between the video recording apparatus of FIG. 1 and the signal provider of FIG. 1 in an embodiment of the invention.

FIG. 2 shows the interchange of signals between video recorder 105 of FIG. 1 and video provider 115 of FIG. 1 in an embodiment of the invention. Signal 205 is the signal sent from video recorder 105 to video provider 115 (received therein as signal 206) when the user programs video recorder 105. Once the signal is received at video provider 115, it is stored by video provider 115. Optionally, signal 205 can be converted from date, time, and channel information to a program identifier, shown as information 210. For example, if signal 205 includes the channel identifier for the local CBS affiliate, the date is indicated as "Every Sunday," and the time is indicated as 7:00 PM–8:00 PM PST, the video provider can translate this information to the program identifier "60 Minutes."

As suggested by the above example (and as is very common in modern videocassette recorders), the programming information can specify a repeating schedule, rather than just a one-time recording. The invention provides for both alternatives, giving the user maximum flexibility in programming video recorder 105.

In an alternative embodiment, after signal 205 is converted to information 210, information 210 can be returned to video recorder 205 and displayed to the user on a text display on the video recording apparatus. This gives the user an opportunity to verify that the desired program is in fact scheduled to be recorded.

Figure 5:
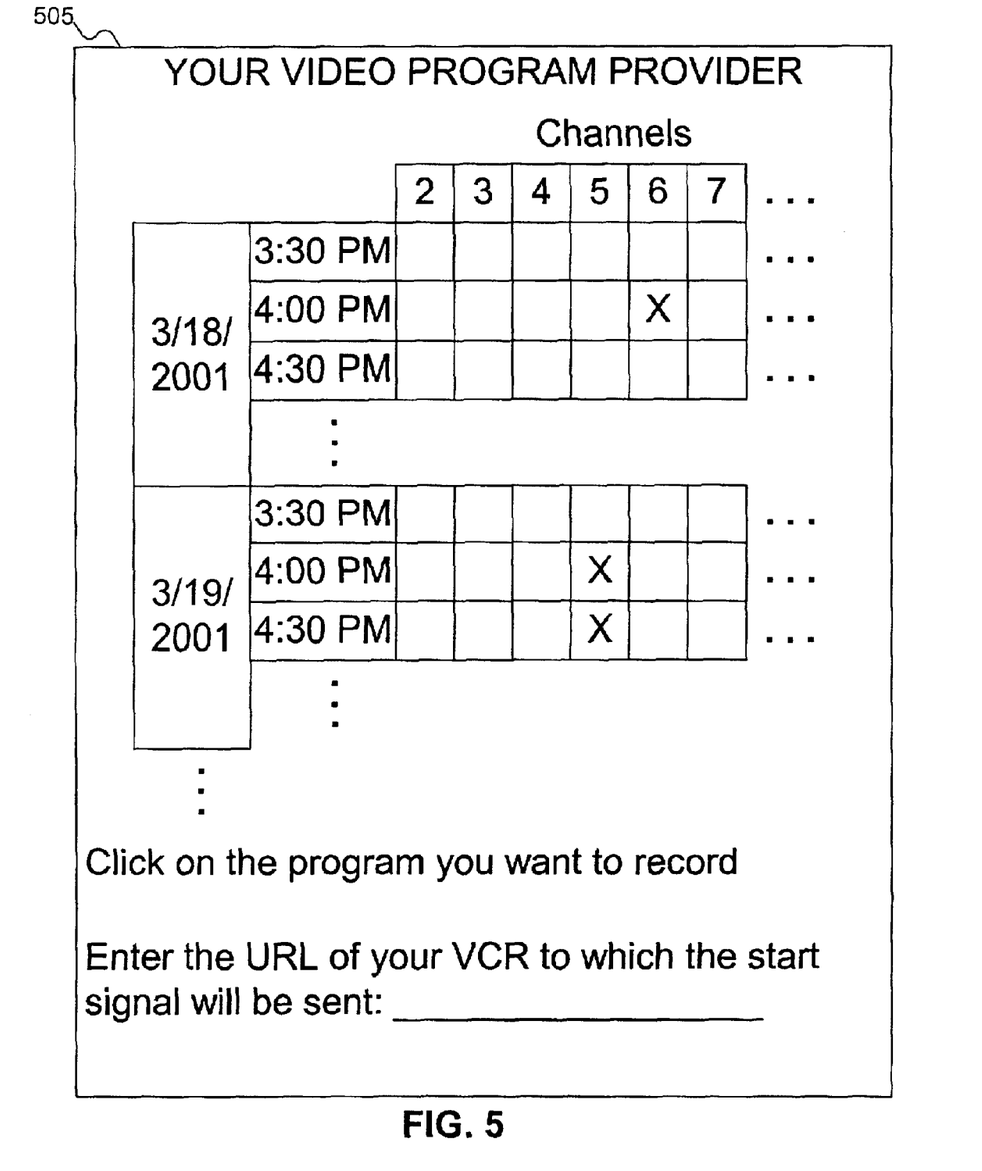
FIG. 5 shows a screen snapshot of a website maintained by a video provider for selecting a program to record.

Signal 205 is sent to video provider 115 via internetwork 125, either through networking apparatus 130 and two-way communications channel 127, or through an independent line. In one embodiment, video provider 115 maintains a website. Referring briefly to FIG. 5, the website can be programmed remotely. The user clicks on one of the displayed programs. Optionally, the user enters either his identifying information (for example, his name as a subscriber), or the address of networking apparatus 130.

In FIG. 5, screen snapshot 505 shows what the website maintained by video provider 115 might look like. It presents the user the option of selecting a program by date, time, and channel. For example, in screen snapshot 505, the user has selected to record on channel 6 from 4:00 PM–4:30 PM PST on Mar. 18, 2001, and from 4:00 PM–5:00 PM PST on channel 5 on Mar. 19, 2001. A person skilled in the art will recognize that website 505 can also be specific to video recorder 105.

Returning to FIG. 2, shortly before the program specified in signal 205 is to begin, video provider 115 sends start signal 215 to video recorder 105 (received therein as start signal 216), preferably using two-way communications channel 127 and networking apparatus 130 and 135. However, a person skilled in the art will recognize that start signal 215 can also be transmitted in other ways, including directly to the video recording apparatus via cable 120. Start signal 215 can include the channel identifier on which the program is being broadcast. In this embodiment, video recorder 105 does not have to store any programming information at all. Once received, video recorder 105 changes to the indicated channel and begins the recording process, as shown by block 220. In this way, video recorder 105 is completely independent from its internal clock, avoiding any concerns about whether the clock is accurate relative to the video provider or about whether the actual start time of the selected program has been shifted.

In one embodiment of the invention, video recorder 105 continues to store the programming information internally. In this embodiment, when video recorder receives start signal 215, it checks its internal programming to see what program was specified to be recorded. Video recorder 105 then changes to the appropriate channel and begins to record.

After sending start signal 215, video provider 115 sends program 222. Video recorder 105 receives program 222 as program 223 and records it.

In another alternative embodiment, video provider 115 also transmits stop signal 225 to video recorder 105 (received therein as stop signal 226). Video provider 115 transmits stop signal 225 just after the selected program has completed its broadcast. Once received, video recorder 105 stops the recording process as indicated by block 230, as the desired program is completely recorded.

There are several additional points worth discussing about the invention. First, in the preferred embodiment, all the programming information is stored within video provider 115. In essence, video recorder 105 acts as a conduit between the user and video provider 115, as video recorder 105 does not need to store any information internally at all.

Second, the amount of time between the transmission of start signal 215 and the start of the broadcast of the selected program can vary, depending on how long video recorder 105 needs to power itself up and begin recording. In the preferred embodiment, video provider 115 sends start signal 215 approximately 10 seconds before the selected program begins its broadcast. This allows a little time for transmission delay and start-up by video recorder 105. However, a person skilled in the art will recognize that other delays, both more and less, can be used. The delay can even be an option customized by the user, allowing the user to specify how long he expects his video recorder to need to start up.

Third, in the preferred embodiment, video provider 115 communicates directly with each video recorder 105, instructing each individual video recorder 105 when to begin and when to end recording. In an alternative embodiment, video provider 115 "broadcasts" a start signal at an appropriate interval before the start of a program on a given channel to a plurality of video recording apparatuses. This start signal includes the channel identifier and, since programs rarely start exactly on the minute, the scheduled time for the program. (Several different start signals can be sent at roughly the same time, each start signal corresponding to a specific program on a specific channel, as many programs tend to start on the hour or the half hour.) In this embodiment, video recorder 105 does not transmit signal 205 to video recorder, but only stores the information internally. Video recorder 105 then processes each start signal and determines for itself whether it needs to recognize any of the start signals. Consider again the "60 Minutes" example above. At around 7:00 PM on any given Sunday, video provider 115 sends out several start signals, each including a channel identifier and the time "7:00 PM PST." One of these start signals specifies the local CBS affiliate. Video recorder 105 processes the start signals one at a time until it recognizes the start signal including the local CBS affiliate channel identifier and specifying 7:00 PM PST. Video recorder 105 then begins to record "60 Minutes."

Fourth, video provider 115 can handle programming changes completely internally. For example, consider the situation where a user selects a program scheduled for broadcast from 4:00 PM–4:30 PM PST on channel 6. A programming change occurs, instigated either by the video provider or by a source used by the video provider, such as a local broadcaster. As a result, the program is no longer broadcast at 4:00 PM–4:30 PM PST, but is now broadcast at 3:00 PM–3:30 PM PST. Video provider 115 can determine the new time slot of the program, and can send the start signal at the correct start time, obviating the need for the user to adjust the programming. In effect, video provider 115 "replaces" the old programming information, which after the programming change identifies the wrong program, with new programming information, correctly identifying the program the customer desires to record. Video provider 115 can even account for changes in date: for example, if a program is shifted from Wednesday to Thursday, video provider 115 can send the start signal on the correct day. In an alternative embodiment, video provider 115 can also send a signal (not shown) to video recorder 105, to alert the user that a programming change has occurred. This alert can be displayed to the user the next time he turns on video recorder 105.

Fifth, the video provider can provide the programming service described herein as an additional service to the broadcast signal. Two models for billing come to mind: billing the customer each time a start signal is sent to the customer's video recording apparatus, or billing once a month for all start signals transmitted. For example, the video provider can charge the customer $0.25 for each start signal sent, or the video provider can charge the customer $1.00/month to send a certain (possibly unlimited) number of start signals. (If the customer exceeds a maximum number of start signals in a given month under the flat rate billing model, the video provider can then charge the customer a piecemeal charge for extra start signals, such as $0.25 per start signal.) A person skilled in the art will recognize that other billing models are also possible.

In the preferred embodiment, video provider 115 only looks for the change of time on the same channel. Thus, if a program is completely canceled, video provider 115 does not send out a start signal, even if the program is available on another channel. But in an alternative embodiment, video provider 115 can examine other channels for the date and time of the program.

Unless the program has been completely canceled, the user does not need to concern himself with the programming change, since video provider 115 handles the programming change without guidance. The user becomes aware of the change when the program is recorded at a different time (or not at all, in the case of canceled programs), or when the user examines the programming. But the user does not need to worry about programming changes.

Another concern can be recording conflicts. For example, the user can select programs from 7:00 PM–8:00 PM PST on channel 2, and from 7:30 PM–9:00 PM PST on channel 4. Because of the overlap, video recorder 105 cannot satisfy both recording requests. This conflict can be handled in the same manner as recording conflicts are currently handled by videocassette recorders: the programming information that starts first completes before any competing programming can begin. Thus, in the above example, video recorder 105 records from 7:00 PM–8:00 PM PST on channel 2, then from 8:00 PM–9:00 PM PST on channel 4. Video provider 115 of course does not care about how the conflict is resolved, or even that it exists. But video recorder 105, when it receives the start signal for the program from 7:30 PM–9:00 PM PST on channel 4, stores that it needs to record on channel 4, and once the recording finishes on channel 2, video recorder 105 immediately begins to record on channel 4.

Another issue that can arise from an embodiment of the invention is the recording of pay-per-view channels or "child-proofed" channels. Typically today, to order a pay-per-view channel requires the customer to contact the video provider by telephone and order the channel. If the customer does not order the program as necessitated by the video provider, the video recording apparatus will not record the desired program (the video provider typically blocks the program and instead displays commercials or static to the non-paying customer). No change is needed to substitute an embodiment of the invention for the standard video recorder in this situation. But if the video provider acknowledges as authorized a request for a pay-per-view program to be recorded through an embodiment of the invention, the authorization code can be made part of the programming information. A person skilled in the art will recognize how the video recording apparatus according to an embodiment of the invention can be modified to include an authorization code as requested by the video provider.

Similarly, blocking children from access to "undesirable" channels is typically handled either at the video provider or within the television, and not the video recording apparatus. The video recording apparatus according to an embodiment of the invention would record static if set to record a program on a blocked channel. Again, a person skilled in the art will recognize how the video recording apparatus according to an embodiment of the invention can be modified to include an unlock code to temporarily access the blocked channel.

Figure 3:
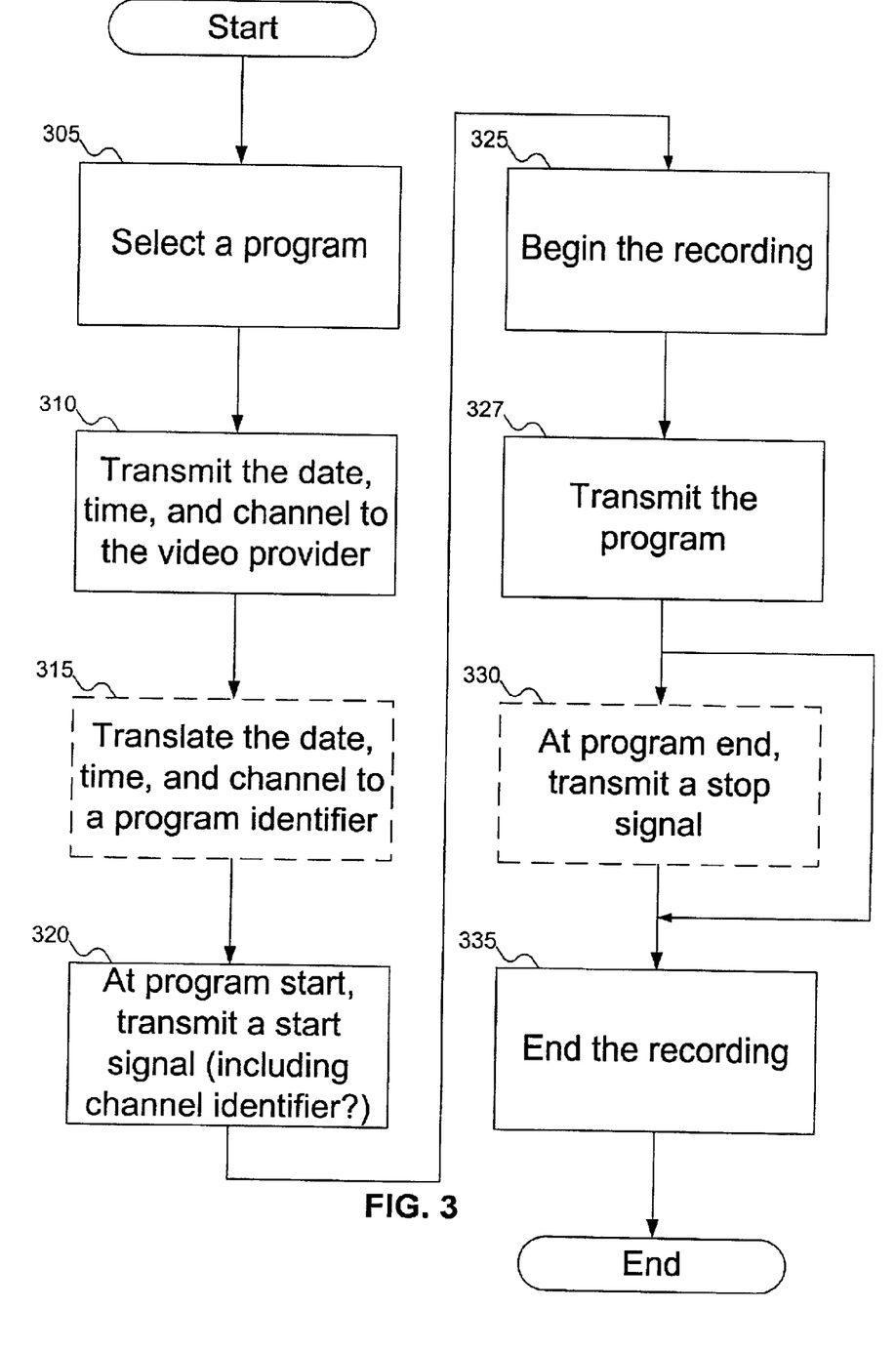
FIG. 3 shows a flowchart of the method used to program and record using the video recording apparatus of FIG. 1 in an embodiment of the invention.

FIG. 3 shows a flowchart of the method used to program and record using the video recording apparatus of FIG. 1 in an embodiment of the invention. In FIG. 3, at step 305, the user selects a program. At step 310, the video recorder transmits the date, time, and channel information to the video provider. At step 315 (which is optional), the video provider translates the date, time, and channel information into specific program information. At step 320, shortly before the start of the program, the video provider transmits a start signal. The start signal can optionally include a channel identifier, if the video recorder has not stored any programming information internally. At step 327, the video provider transmits the program, which is received by the video recorder. At step 325, the video recorder begins to record the program. At step 330 (which is optional, since the video recorder can store the programming information internally), the video provider transmits a stop signal. Finally, at step 335, the video recorder stops recording the program.

Figure 4:
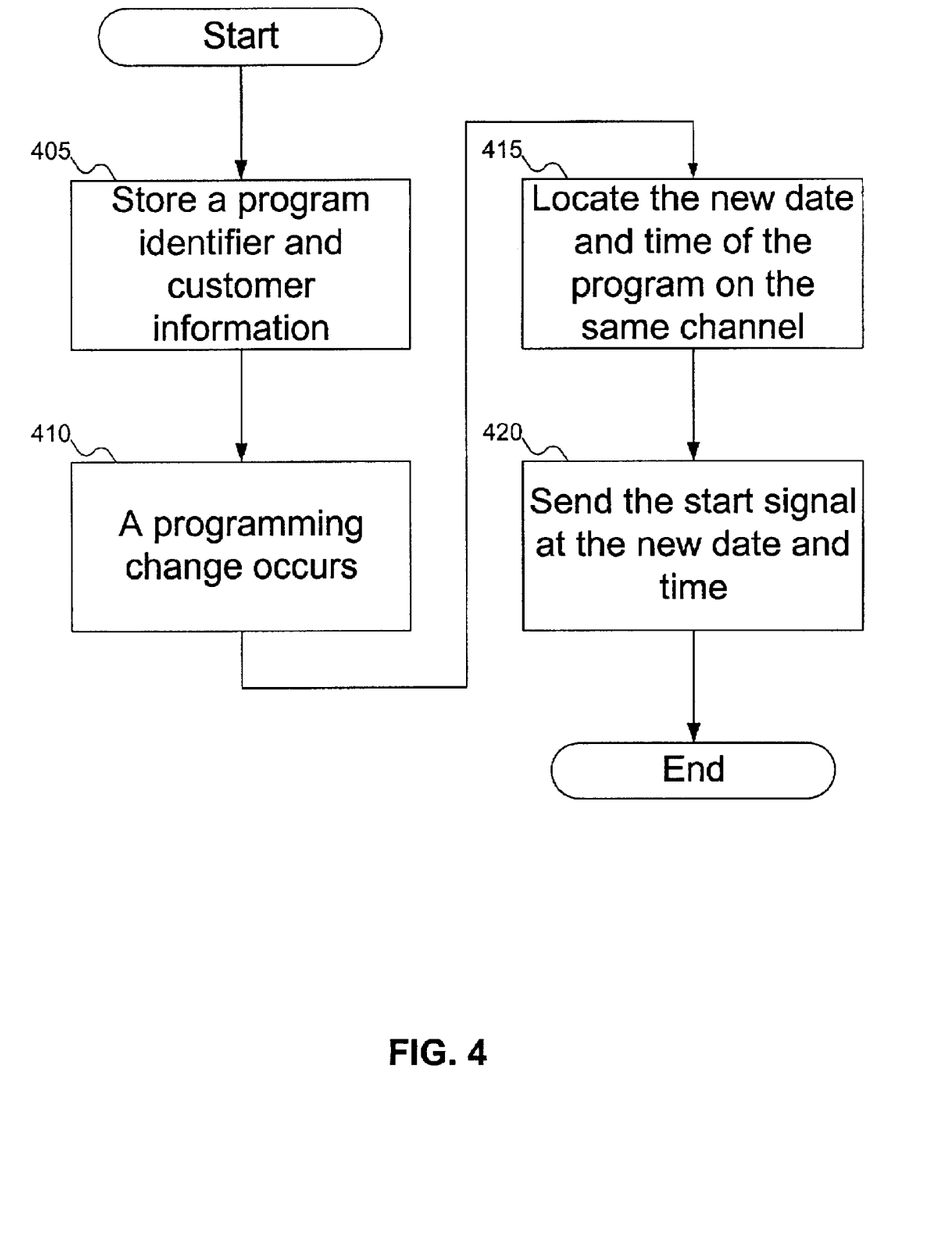
FIG. 4 shows a flowchart of the method used by the signal provider of FIG. 1 to adjust the programming of the video recording apparatus of FIG. 1 to account for a programming change in an embodiment of the invention.

FIG. 4 shows a flowchart of the method used by the signal provider of FIG. 1 to adjust the programming of the video recording apparatus of FIG. 1 to account for a programming change in an embodiment of the invention. At step 405, the video provider stores a program identifier. As discussed above, the program identifier is derived from the date, time, and channel of the selected program. The video provider also stores customer information (such as the Internet Protocol (IP) address of the video recording apparatus), so that the video provider will know to which video recording apparatus to transmit the start-recording signal. At step 410, the programming lineup changes. This can be instituted by the video provider or can be imposed on the video provider by the sources of its programming. (For example, cable companies carry local channels as part of the cable programming. The video provider has no control over the local channel changing its programming lineup.) At step 415, the video provider locates the new date and time for the program. In the preferred embodiment, the video provider does not scan for the selected program on a different channel. Thus, even if the program is available on another channel, if the program cannot be found on the original channel, in the preferred embodiment the video provider does not send a start signal to the video recorder. Finally, at step 420, the video provider sends a start signal to record the program at its new date and/or time.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for using a video recording apparatus, the method comprising:

selecting a program to record using the video recording apparatus;

programming information about the selected program into the video recording apparatus;

receiving an externally-generated start signal from a video provider before a broadcast of the selected program, the video provider operative to simultaneously broadcast the selected program and an unselected program in a video signal to the video recording apparatus and a second video recording apparatus, the video recording apparatus and the second video recording apparatus operative to independently receive and record one of the selected program and the unselected program in the video signal;

receiving the video signal from the video provider, the video signal received separately from the externally-generated start signal; and recording the selected program from the video signal responsive to the received start signal.

2. A method for using a video recording apparatus, the method comprising:

selecting a program to record;

programming information about the selected program into the video recording apparatus, the programming information including a date, time, and channel identifier for the selected program;

transmitting the programming information from the video recording apparatus to a video provider outside the video recording apparatus, the video provider being one of a cable company, a satellite television company, or a public broadcaster;

receiving an externally-generated start signal from the video provider before a broadcast of the selected program; and recording the program responsive to the received start signal.

3. A method according to claim 2, the method further comprising:

receiving an externally-generated stop signal; and ending recording of the program responsive to the received stop signal.

4. A method according to claim 2, wherein transmitting includes transmitting the programming information over a network from the video recording apparatus.

5. A method according to claim 2, wherein transmitting includes transmitting the programming information over an electrically conductive wire from the video recording apparatus.

6. A method according to claim 2, further comprising editing the programming information on a website.

7. A method according to claim 2, wherein receiving the externally-generated start signal includes receiving a channel identifier on which the selected program is broadcast.

8. A method according to claim 2, wherein receiving the externally-generated start signal includes receiving the externally-generated start signal over a network.

9. A method according to claim 2, the method further comprising:

storing the programming information at the video provider; and replacing the programming information at the video provider with new programming information to account for a change in a schedule at the video provider.

10. A method according to claim 2, the method further comprising charging a customer for transmitting the externally-generated start signal by the video provider.

11. A method according to claim 2, wherein receiving the externally-generated start signal includes receiving the externally-generated start signal from the video provider over a network.

12. A method according to claim 11, wherein receiving the externally-generated start signal includes receiving the externally-generated start signal from the video provider over a network separately from the program.

13. A method according to claim 2, wherein receiving an externally-generated start from the video provider includes receiving the externally-generated start signal from the video provider on a channel separate from a transmission of the program.

14. A method according to claim 2, further comprising selecting s delay between receipt of the externally-generated start signal and receipt of the video signal.

15. A method according to claim 2, wherein programming information about the selected program into the video recording apparatus includes:
   forwarding the information about the selected program to the video provider; and
   storing no information about the selected program on the video recording apparatus.

16. A computer-readable medium containing a program that, when executed by a video recording apparatus, results in:
   selecting a program to record;
   programming information about the selected program into the video recording apparatus, the programming information including a date, time, and channel identified for the selected program;
   transmitting the programming information from the video recording apparatus to a video provider outside the video recording apparatus, the video provider being one of a cable company, a satellite television company, or a public broadcaster;
   receiving an eternally-generated start signal from the video provider before a broadcast of the selected program; and
   recording the program responsive to the received start signal.

17. A video recording apparatus, comprising:
   means for receiving a transmission;
   means for recording the transmission;
   means for playing the recording of the transmission;
   circuitry constructed and arranged to receive a start signal to start recording from a video provider before a broadcast of a selected program, the video provider being one of a cable company, a satellite television company, or a public broadcaster; and
   means for transmitting information about the selected program to the video provider.

18. A video recording apparatus according to claim 17, wherein the start signal includes a channel identifier on which channel a selected program is broadcast.

19. A video recording apparatus according to claim 17, the improvement further comprising circuitry constructed and arranged to receive a stop signal to stop recording.

20. A video recording apparatus according to claim 17, wherein the circuitry is further constructed and arranged to receive the start signal over a network.

21. A video recording apparatus according to claim 17, further comprising means for selecting a delay between receipt of the start signal and receipt of the video signal.

22. A video recording apparatus according to claim 17, wherein the means for transmitting information about a selected program to the video provider includes:
   means for transmitting to the video provider the about the selected program; and
   means for storing no information about the selected program on the video recording apparatus.

23. A video broadcast apparatus, comprising:
   means for broadcasting a video signal to a plurality of video recording apparatuses, the video signal including a plurality of simultaneous programs and each video recording apparatus operative to independently receive and record one of the programs in the video signal;
   reception circuitry constructed and arranged to receive a programming information about a selected program from one of the video recording apparatuses; and
   transmission circuitry responsive to the received programming information to send a start signal to the one of the video recording apparatus before the selected program is broadcast in the video signal by the video broadcast apparatus.

24. A video broadcast apparatus according to claim 23, wherein the selected program includes a date, time, and channel identifier, including means for translating the date, time, and channel identifier into a program identifier.

25. A video broadcast apparatus according to claim 24, including means for replacing the program identifier with a new program identifier after a schedule change by the video provider.

26. A video broadcast apparatus according to claim 23, wherein the transmission circuitry includes circuitry constructed and arranged to send a channel identifier to the video recording apparatus.

27. A video broadcast apparatus according to claim 23, wherein the transmission circuitry is constructed and arranged to further transmit a stop signal.

28. A system, comprising:
   an agent apparatus to receive a video signal from a video provider, the video provider being one of a cable company, a satellite television company, or a public broadcaster and operative to simultaneously transmit a first program and a second program in the video signal, the agent apparatus operative to relay the first program of the video signal and not the second program; and
   a video recording apparatus coupled to the agent apparatus, including:
      means for transmitting information about the first program to the video provider;
      means for receiving the first program from the agent apparatus;
      means for recording the first program;
      means for playing the recording of the first program; and
      circuitry constructed and arranged to receive from the video provider a start signal to start recording before receiving the first program.

29. A system according to claim 28, wherein the video recording apparatus further includes means for selecting a delay between receipt of the start signal and receipt of the video signal.

30. A system according to claim 28, wherein the means for transmitting information about the first program to the video provider includes:
   means for transmitting to the video provider the about the selected program; and
   means for storing no information about the selected program on the video recording apparatus.

31. A method for using a video recording apparatus, the method comprising:
   selecting a program to record;
   programming information about the selected program into the video recording apparatus, the programming information including a date, time, and channel identifier for the selected program;

transmitting the programming information from the video recording apparatus to a video provider outside the video recording apparatus, the video provider operative to simultaneously broadcast the selected program and an unselected program in a video signal to the video recording apparatus and a second video recording apparatus, the video recording apparatus and the second video recording apparatus operative to independently receive and record one of the selected program and the unselected program in the video signal;

receiving an externally-generated start signal from the video provider before receiving the selected program; and recording the program responsive to the received start signal.

32. A method according to claim 31, further comprising selecting a delay between receipt of the externally-generated start signal and receipt of the video signal.

33. A method according to claim 31, wherein programming information about the selected program into the video recording apparatus includes:

forwarding the information about the selected program to the video provider; and storing no information about the selected program on the video recording apparatus.

* * * * *

UNITED STATES PATENT AND TRADEMARK OFFICE
CERTIFICATE OF CORRECTION

PATENT NO. : 6,857,129 B2
DATED : February 15, 2005
INVENTOR(S) : Rogson et al.

It is certified that error appears in the above-identified patent and that said Letters Patent is hereby corrected as shown below:

Column 9,
Line 5, replace "start" with -- start-signal --.
Line 11, replace "selecting s delay" with -- selecting a delay --.

Signed and Sealed this

Twenty-eighth Day of February, 2006

JON W. DUDAS
*Director of the United States Patent and Trademark Office*